(12) United States Patent
Putter

(10) Patent No.: US 6,268,001 B1
(45) Date of Patent: Jul. 31, 2001

(54) METHOD AND DEVICE FOR PRESERVING FOOD PRODUCTS

(76) Inventor: Willem Antoon Pieter Putter, Kuiperspad 6, NL-1911 AX, Uitgeest (NL)

( * ) Notice: Subject to any disclaimer, the term of this patent is extended or adjusted under 35 U.S.C. 154(b) by 0 days.

(21) Appl. No.: 09/486,399
(22) PCT Filed: Aug. 24, 1998
(86) PCT No.: PCT/NL98/00476
§ 371 Date: Mar. 30, 2000
§ 102(e) Date: Mar. 30, 2000
(87) PCT Pub. No.: WO99/11134
PCT Pub. Date: Mar. 11, 1999

(30) Foreign Application Priority Data

Aug. 29, 1997 (NL) .................................................. 1006879

(51) Int. Cl.$^7$ ................. A23L 1/27; A61L 2/00
(52) U.S. Cl. ................. 426/263; 426/320; 426/326; 422/293
(58) Field of Search ................. 426/263, 266, 426/326, 496, 320; 422/28, 33, 40, 295, 296, 292, 293

(56) References Cited

U.S. PATENT DOCUMENTS

| | | |
|---|---|---|
| 2,606,704 | 8/1952 | Nichols ................. 226/20.6 |
| 2,739,522 * | 3/1956 | Grahm, Jr. ................. 426/106 |
| 3,498,798 * | 3/1970 | Bauer et al. ................. 426/106 |
| 3,574,642 | 4/1971 | Weinke ................. 99/174 |
| 3,714,887 * | 2/1973 | Johnson ................. 99/239 |
| 3,773,527 * | 11/1973 | Ruggerone ................. 426/106 |
| 4,515,266 * | 5/1985 | Myers ................. 206/205 |
| 4,961,322 * | 10/1990 | Oguma et al. ................. 62/179 |
| 5,395,634 * | 3/1995 | Humphreys ................. 426/312 |

FOREIGN PATENT DOCUMENTS

| | | |
|---|---|---|
| 85400152 * | 8/1985 | (EP) . |
| 0 309 132 | 3/1989 | (EP) . |
| 0 313 168 | 4/1989 | (EP) . |
| 0 616 945 | 9/1994 | (EP) . |
| 0 654 218 | 5/1995 | (EP) . |
| 0 666 028 | 8/1995 | (EP) . |
| 1115890 | 4/1956 | (FR) . |
| 1350108 | 4/1964 | (FR) . |
| 2595036 * | 9/1987 | (FR) . |
| 2623471 | 5/1989 | (FR) . |
| 2330816 * | 5/1999 | (GB) . |
| 2330817 * | 5/1999 | (GB) . |
| WO 89/01440 | 2/1989 | (WO) . |
| WO 93/20700 | 10/1993 | (WO) . |

* cited by examiner

Primary Examiner—Nina Bhat
(74) Attorney, Agent, or Firm—Young & Thompson

(57) ABSTRACT

A method for preserving a food product includes the steps of placing the food product in a gastight chamber, lowering the pressure in the chamber, introducing into the chamber a first quantity of gas which at least partially penetrates the product, subsequently introducing into the chamber at least a second quantity of gas.

13 Claims, 1 Drawing Sheet

METHOD AND DEVICE FOR PRESERVING FOOD PRODUCTS

This application is the 35 USC 371 national stage application of International application PCT/NL98/00476 filed on Aug. 24, 1998, which designated the United States of America.

BACKGROUND OF THE INVENTION

The invention relates to the preservation of food products, in particular of bread products. In the case of such products a preserving gas, such as carbon dioxide, is added to the product in order to counteract spores of, for example, moulds or germs of bacteria. Oxidation of the product is also prevented. The shelf life of such food product increases as a result.

However, in the case of bread products the disadvantage is that the carbon dioxide has an adverse effect on the flavour. Efforts have been made to overcome this problem by using a mixture of nitrogen gas and carbon dioxide. However, since carbon dioxide dissolves quickly in the moisture present in a bread product, it is not the nitrogen gas, but the carbon dioxide which tends to go into the product, so that there is still an adverse effect on the flavour.

As a result of that effect, a certain separation therefore occurs in the pack, in the course of which the inert nitrogen gas which actually does not affect the flavour of the product disappears from the product. It is forced out by the carbon dioxide which initially was still outside the product in the pack.

Another disadvantage is that the carbon dioxide dissolves in the moisture of a product such as bread. As a result of this, the gas volume in the pack decreases, which in turn leads to shrinkage of pack with product. The product is in fact slightly compressed under the influence of atmospheric pressure. The saleability of the product is consequently reduced.

SUMMARY OF THE INVENTION

The object of the invention is therefore to provide a method which does not have these disadvantages, or has them to a lesser extent. That object is achieved by the fact that the invention relates to a method for preserving a food product such as a bread product, comprising the steps of:
 placing the food product in a suitable chamber,
 lowering the pressure in the chamber,
 introducing into the chamber a first quantity of gas, which at least partially penetrates the product,
 subsequently introducing into the chamber at least a second quantity of gas.

In particular, two different types of gas are introduced in succession. At least one of the quantities of gas can comprise a preserving gas for counteracting microorganisms such as moulds and the like.

According to the invention, a quantity of auxiliary gas is first introduced into the chamber, which gas at least partially penetrates into the product, and a quantity of preserving gas is then introduced into the chamber.

Introducing the auxiliary gas, in particular nitrogen gas, into the chamber first means that said gas is given a clear path for penetration into the bread product. The vacuum created therein must after all be filled, and only nitrogen gas is available for that purpose in this phase of the method according to the invention.

The preserving gas, in particular carbon dioxide, is then admitted, which gas is forced to collect on the outside of the product. However, that is precisely where the greatest risk of mould formation occurs. A freshly baked, hot bread product is in fact sterile as a result of the baking temperature. When it is being conveyed out of the oven, only the outside of the product is initially exposed to the risk of contamination. That is where the carbon dioxide has a beneficial effect.

Another advantage of the method according to the invention is that the gases need not be mixed beforehand. Prior mixing first of all leads to higher costs, and the quantity of carbon dioxide which can be mixed with nitrogen gas must not be too great either. Since carbon dioxide is heavier than nitrogen gas, the quantity of carbon dioxide at a maximum pressure of approx. 200 bar must remain restricted to 30%, otherwise separation would occur. Such a mixture is available as a standard mixture.

However, in the case of the method according to the invention the proportions can be selected freely. Therefore, a quantity of 50% nitrogen gas, for example, can be selected. A quantity of 50% carbon dioxide can then be added, with the result that an excellent preservative effect is ensured without appreciable change of flavour occurring.

The method according to the invention can also be carried out according to a variant which is suitable in particular for bread products with moisture-containing ingredients such as raising, currants, (candied) fruits. Particularly in the case of soaked fruits, the problem can occur that the fruit start to form alcohol.

In those case it is actually desirable for the carbon dioxide to be able to reach these ingredients freely, without being obstructed by nitrogen gas already present.

To that end, the method according to the invention can comprise the additional step of initially introducing into the chamber a first quantity of preserving gas before the steps of introducing into the chamber the auxiliary gas and introducing into the chamber a second quantity of preserving gas.

The limited quantity of carbon dioxide introduced as a first step will only dissolve quickly in the ingredients with a relatively large amount of moisture. Introducing the nitrogen gas immediately after that ensures that said nitrogen gas can still penetrate into the bread product.

The quantity of carbon dioxide introduced last then remains on the outside of the product.

The final pressure in the pack obtained can be atmospheric or also slightly lower or higher.

The invention also relates to a device for carrying out the method, comprising a chamber which can be sealed off in a gastight manner and is provided with an access, a vacuum pump connected to the chamber, for lowering the pressure in the sealed chamber, a first gas supply line which is connectable to a source of auxiliary gas, and at leas a second gas supply line which is connectable to a source of preserving gas.

BRIEF DESCRIPTION OF THE DRAWINGS

The invention will be explained in greater detail below with reference to the device shown in the figures.

DETAILED DESCRIPTION OF THE PREFERRED EMBODIMENTS

Figure 1:
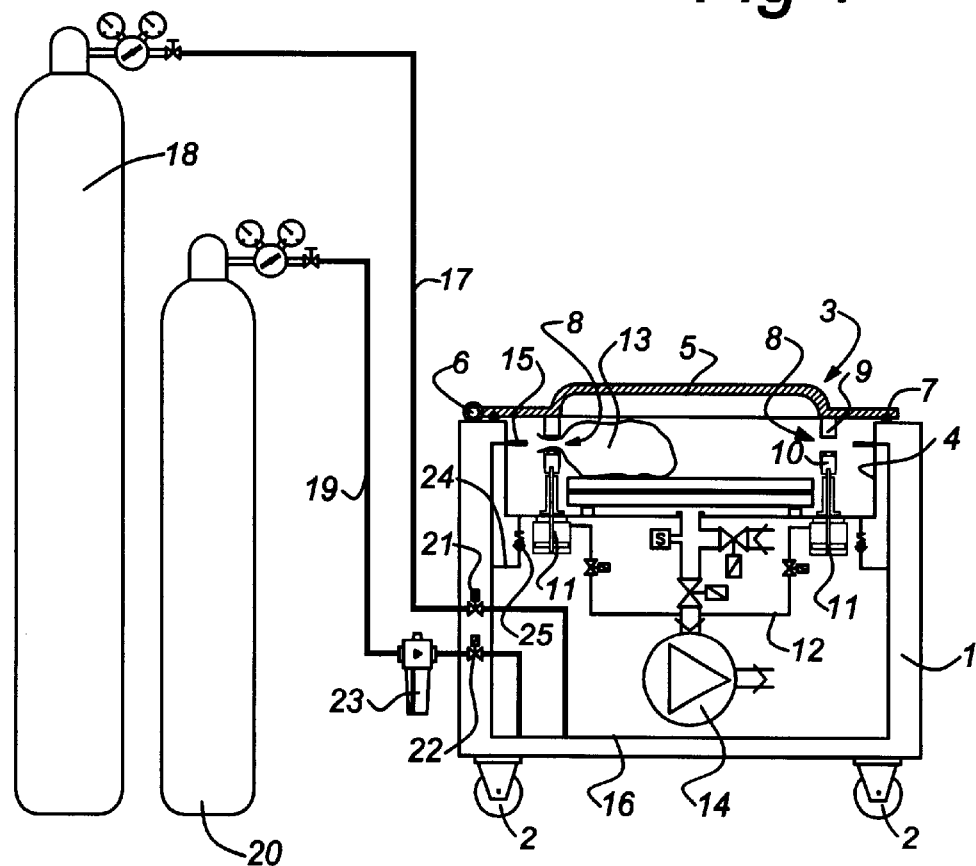
FIG. 1 shows a diagrammatic representation in section of the device according to the invention.
Figure 2:
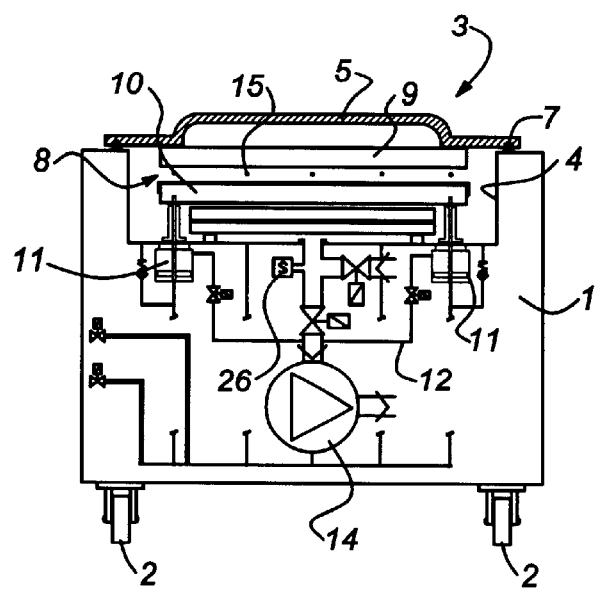
FIG. 2 shows an end view in section.

The device shown in FIG. 1 comprises a frame with wheels 2, on which the vacuum chamber, indicated in its entirety by 3, is accommodated. Said vacuum chamber comprises a fixed base part 4 and a cover 5 which can be opened and closed about hinge 6. An airtight closure is ensured by means of the seal 7 running around the cover 5.

Two welding or sealing devices 8 are accommodated in a known manner in the vacuum chamber 3. Said devices 8 each comprise a top bar 9, which is fixed to the cover 5, and a bottom bar 10, which can be moved up and down.

The bottom bars 10 can be operated by means of the piston/cylinder devices 11 and the accompanying pneumatic device 12. The bars 9, 10 can also be heated, for the purpose of sealing a bag-shaped packing material, one of which bag shapes is indicated by reference number 13.

As usual, the bag-shaped material, in particular the part situated between the bars 9, 10, can be heat-sealed.

According to the invention, the packaging material 13 containing the product to be packed, for example a bread product, is introduced into the chamber 3 in the manner shown in FIG. 1, in which case a row of packed material 13 can, of course, be positioned at the position of each sealing device 8.

The space in the vacuum chamber 3 can be vacuumed by means of pump 14, after which a gas can flow through the nozzles 15 until inside the packs 3.

This gas is uniformly distributed over all nozzles 15 by means of the main line 16.

The line 16 according to the invention is connected to a first gas supply line 17, which is connected to a first gas source, for example gas bottle 18, and a second gas supply line 19, which is connected to a second gas source, such as a gas bottle 20. The lines 17, 19 are connected to line 16 by means of respective valves 21, 22.

According to the invention, it is now possible first to cause an auxiliary gas, such as nitrogen gas, for example, to flow into the packs 13 by opening valve 21.

Valve 21 is then closed, and valve 22 is opened, in such a way that the preserving carbon dioxide can flow into the packs 13.

The carbon dioxide is thereby forced to remain on the outside of the product, where the preserving action then occurs.

On the other hand, the carbon dioxide cannot penetrate into the product, since the nitrogen gas has already collected there. The flavour of the product can thus be retained.

The device according to the invention can, of course, also be designed in a different way, for example with more than two containers, each connected by means of its own line to main line 16.

In addition, an atomizer 23 can be accommodated in one of the lines, in order to atomize a flavouring product, such as a liqueur flavour, into the gas.

Main line 16 is also connected by means of bypass line 24 with non-return valve 25 to the chamber 3. It can be ensured in this way that the chamber 3 can be filled sufficiently rapidly with gas, which benefits the speed of production.

If the gas had to be injected completely through the nozzles 15, too strong a flow could occur, which can have an adverse effect on the packs 13.

Although in the above, carbon dioxide and nitrogen gas are used, several other gases can be used in other applications. That is the case, for example, in the meat processing industry. In addition to carbon dioxide and nitrogen gas, a little oxygen can also be used here, in order to retain the colour and appearance of the meat product.

What is claimed is:

1. Method for preserving a food product, comprising the steps of:

placing the food product in a gastight chamber;

lowering the pressure in the chamber;

introducing into the chamber a quantity of gas which at least partially penetrates the product; and subsequently introducing into the chamber at least a quantity of a different gas while maintaining the first quantity gas at least partially in the chamber, wherein at least one of the quantities of gas comprises a preserving gas for counter-acting micro-organisms, and the other of said gases is an auxiliary gas.

2. The method according to claim 1, wherein said quantity of said auxiliary gas is first introduced into the chamber, said auxiliary gas penetrating at least partially into the product, and said quantity of preserving gas is then introduced into the chamber.

3. The method according to claim 1, wherein a first quantity of a first preserving gas is introduced initially into the chamber, then said auxiliary gas is introduced and thereafter a second quantity of a second preserving gas is introduced.

4. The method according to claim 3, wherein the first and the second preserving gases are the same gas.

5. The method according to claim 1, wherein the pressure in the chamber rises to atmospheric pressure when the gases are being introduced.

6. The method according to claim 1, wherein the pressure in the chamber falls below atmospheric pressure when the gases are being introduced.

7. The method according to claim 1, wherein the pressure in the chamber rises above atmospheric pressure when the gases are being introduced.

8. The method according to claim 1, wherein the auxiliary gas is nitrogen gas, and the preserving gas is carbon dioxide.

9. The method according to claim 8, wherein 20 volume % nitrogen gas is added, and 80 volume % carbon dioxide is added.

10. A device for carrying out the method according to claim 9, comprising:

said chamber which can be sealed off in a gastight manner and is provide with an access for placing a product to be treated in said chamber;

a vacuum pump connected to said chamber, for lowering the pressure in the sealed chamber;

a first gas supply line which is connectable to a source of said first gas; and at least a second gas supply line which is connectable to a source with said second gas.

11. The device according to claim 10, wherein each of said first and said second gas supply lines further comprise:

at least one nozzle for blowing gas into the chamber, and at least one additional supply line for supplying gas.

12. The device according to claim 10, in which the chamber is connected to a pressure sensor, for measuring the pressure in the chamber.

13. A method for preserving a food product comprising the steps of:

placing the food product in a chamber;

sealing said chamber gastight;

lowering a pressure in the chamber;

introducing into the chamber a quantity of a first gas which at least partially penetrates the food product; and subsequently introducing into the chamber at least a quantity of a second gas different from said first gas wherein one of said gases is a preserving gas for counter-acting micro-organisms and the other of said gases is an auxiliary gas.

* * * * *